US007003173B2

(12) United States Patent
Deshpande

(10) Patent No.: US 7,003,173 B2
(45) Date of Patent: Feb. 21, 2006

(54) FILTER FOR COMBINED DE-RINGING AND EDGE SHARPENING

(75) Inventor: Sachin G. Deshpande, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 599 days.

(21) Appl. No.: 09/881,384

(22) Filed: Jun. 12, 2001

(65) Prior Publication Data
US 2003/0081854 A1 May 1, 2003

(51) Int. Cl.
G06K 9/40 (2006.01)
(52) U.S. Cl. .................................... 382/261; 382/266
(58) Field of Classification Search ................ 382/261, 382/254, 260, 262, 263, 264, 265, 266, 268, 382/269, 275
See application file for complete search history.

(56) References Cited

U.S. PATENT DOCUMENTS

| | | | | |
|---|---|---|---|---|
| 5,327,257 A | * | 7/1994 | Hrytzak et al. | 358/447 |
| 5,757,977 A | | 5/1998 | Mancuso et al. | 382/260 |
| 5,774,599 A | * | 6/1998 | Muka et al. | 382/254 |
| 5,802,218 A | | 9/1998 | Brailean | 382/275 |
| 5,818,972 A | | 10/1998 | Girod et al. | 382/260 |
| 5,819,035 A | | 10/1998 | Devaney et al. | 709/202 |
| 5,822,467 A | | 10/1998 | Lopez et al. | 382/263 |
| 5,850,294 A | | 12/1998 | Apostolopoulos et al. | 358/426.14 |
| 5,852,475 A | | 12/1998 | Gupta et al. | 348/606 |
| 5,883,983 A | * | 3/1999 | Lee et al. | 382/268 |
| 6,044,182 A | * | 3/2000 | Daly et al. | 382/284 |
| 6,141,446 A | * | 10/2000 | Boliek et al. | 382/233 |
| 6,226,050 B1 | * | 5/2001 | Lee | 348/607 |
| 6,236,763 B1 | | 5/2001 | Wong et al. | 382/261 |
| 6,259,823 B1 | * | 7/2001 | Lee et al. | 382/268 |
| 6,360,024 B1 | | 3/2002 | Tan et al. | 382/260 |
| 6,539,060 B1 | * | 3/2003 | Lee et al. | 375/240.29 |
| 6,665,346 B1 | * | 12/2003 | Lee et al. | 375/240.29 |
| 2002/0097439 A1 | * | 7/2002 | Braica | 358/3.26 |

FOREIGN PATENT DOCUMENTS

JP 4321391 11/1992

OTHER PUBLICATIONS

Hoon Paek, Rin-Chul Kim, and Sang-Uk Lee, "A DCT-Based Spatially Adaptive Post-Processing Techique to Reduce the Blocking Artifacts in Transform Coded Images," IEEE Transactions on Circuits and Systems for Video Technology, Feb. 2000, pp. 36-41, vol. 10, No. 1.

Huyn Wook Park and Yung Lyul Lee, "A Postprocessing Method for Reducing Quantization Effects in Low Bit-Rate Moving Picture Coding," IEEE Transactions on Circuits and Systems for Video Technology, Feb. 1999, pp. 161-171, vol. 9, No. 1.

* cited by examiner

Primary Examiner—Bhavesh M. Mehta
Assistant Examiner—Dennis Rosario
(74) Attorney, Agent, or Firm—Law Office of Karen Dana Oster

(57) ABSTRACT

A filter for post-processing digital images and videos, having an edge mapper, a pixel sorter, and an adaptive filter that simultaneously performs de-ringing and edge sharpening. The combined filter is computationally simpler than known methods and can achieve removal of ringing artifacts and sharpening of true edges at the same time. The present invention also includes a preferred method of simultaneously de-ringing and edge sharpening digital images and videos.

42 Claims, 11 Drawing Sheets

FILTER FOR COMBINED DE-RINGING AND EDGE SHARPENING

BACKGROUND OF THE INVENTION

The present invention is directed to methods and systems for processing digital image signals and more specifically to post-processing methods and systems that reduce quantization noise and coding artifacts in decoded digital images and videos.

An image or video sequence may be converted to electronic signals and stored or transmitted digitally. Encoding an image usually includes estimating approximate visual attributes for small blocks of the image. Encoding also usually includes a data compression ("quantization") scheme for efficiently storing and transmitting a minimum number of bits. The encoding approximations and quantization may degrade the visual quality of the decoded image so a compromise is usually sought between image quality and bit requirements.

The Joint Photographical Expert Group ("JPEG") and the Motion Picture Experts Group ("MPEG") have established standards for the digital representation of images and videos. In the MPEG syntax, for instance, only the bit stream syntax for decoding is specified. This leaves flexibility for the encoder design, which may use standard quantization schemes. An external processor may be used to reduce quantization noise and coding artifacts from a digital signal decompressed by a decoder ("post-processing"). The post-processor is typically a filter that refines and improves displayed images without altering existing quantization schemes, which may be designed into the hardware.

Post-processing systems may now be integrated into new designs for systems that use new quantization standards. Existing quantization schemes, however, may be enhanced by using post-processing filters that can be added to existing systems.

Early digital image compression techniques sought to transmit an image at the lowest possible bit rate and yet reconstruct the image with a minimum loss of perceived quality. These early attempts used information theory to minimize the mean squared error ("MMSE"). But the human visual system ("HVS") does not perceive quality in the MMSE sense, and the classical coding theory of MMSE did not necessarily yield results pleasing to the HVS. Further, classical MMSE theory applied to the human enjoyment of moving video scenes did not yield pleasing results.

For certain wavelengths, the human eye can see a single photon of light in a dark room. This sensitivity of the HVS also applies to quantization noise and coding artifacts within video scenes. The sensitivity of the HVS changes from one part of a video image to another. For example, human sensitivity to quantization noise and coding artifacts is less in the very bright and very dark areas of a video scene (contrast sensitivity). In busy image areas containing high texture or having large contrast or signal variance, the sensitivity of the HVS to distortion decreases. In these busy areas, the quantization noise and coding artifacts get lost in complex patterns. This is known as a masking effect. In smooth parts of an image with low variation, human sensitivity to contrast and distortion increases. For instance, a single fleck of pepper is immediately noticeable and out of place in a container of salt. Likewise, a single contrasting pixel out of place near a strong visual edge in an image may be noticeable and annoying.

The local variance of a video signal is often noticeable to the HVS on a very small scale: from pixel to pixel or from macroblock to macroblock. This means that filters that remove quantization noise and coding artifacts must filter digital data on a scale representing very small blocks of an image. Filters that remove ringing artifacts and sharpen edges of a visual image must perform calculations and operate on each macroblock, or more ideally, on each pixel in a digital image.

In order to convert an image to a digital representation suitable for quantization, an encoder must divide an image into small blocks, each having visual characteristics (such as detail complexity, brightness, and contrast with neighboring blocks) that may be expressed quantitatively for numerical processing. An image is usually partitioned into nonoverlapping blocks having 8 pixels on each side. One scheme for creating a digital representation of an image is discrete cosine transformation ("DCT"). DCT is one method of numerically approximating the visual attributes of an 8×8 pixel block of an image. Partitioning an image into small blocks before applying DCT ("block DCT") reduces computational intensity and memory requirements. This simplifies hardware design. Accordingly, many of the image compression standards available use block DCT coding.

For low bit digital storage and transmission of an image, quantization noise and coding artifacts may appear in the displayed image due to the approximations introduced by block DCT and a quantization scheme, if present. In moving video scenes, these artifacts show as run-time snow and as dirty uncovered backgrounds. Significant artifacts among frames can result in run-time flicker if they are repetitive.

The objectionable artifacts that occur when pictures are coded at low bit rates are color bleeding, blurriness, blockiness, and ringing. Color bleeding is specific to strong chrominance edges. Blurriness is the result of loss of spatial detail in medium-textured and high-textured areas. The two most prevalent coding artifacts are blockiness resulting in loss of edge sharpness, and ringing, the intermittent distortion near visual object boundaries.

Blockiness is the artifact related to the appearance of the 8×8 DCT grid caused by coarse quantization in low-detail areas. This sometimes causes pixelation of straight lines and a loss of edge sharpness. Blockiness occurs when adjacent blocks in an image are processed separately from each other, and coding approximations assigned to each block cause a visual contrast between neighboring blocks that had visual continuity in the original image. For instance, if neighboring blocks lie in an area of the image where intensity is changing, the decoded intensity assigned to each block may not capture the original intensity gradient.

Ringing (also referred to as mosquito noise) occurs at edges on flat backgrounds where high frequencies are poorly quantized. Accordingly, ringing is usually associated with sharp image boundaries, such as text against a uniform background or computer graphics. Coarser quantization block DCT systems are typically ineffective when coding sharp visual edges, so decompressed images usually have distortion at these edges. Known de-ringing filters blur the true edges when they attempt to remove the ringing artifacts.

The majority of the image (JPEG) and video (MPEG) coding standards are based on the use of block DCT. One serious drawback of compressing images using these standards is the blockiness and ringing artifacts that occur in a decoded image.

Edge sharpening by strengthening the true visual edges in an image is a common post-processing method used to remove artifacts. U.S. Pat. No. 5,822,467 to Lopez et al., entitled "Sharpening Filter for Images with Automatic Adaptation to Image Type" is directed to a filtering method that uses Laplacian filter coefficients and normalization divisors. U.S. Pat. No. 5,818,972 to Girod et al., entitled "Method and Apparatus For Enhancing Images Using Helper Signals" is directed to a filtering method that uses helper signal architecture and nonlinear characteristic functions. U.S. Pat. No. 5,757,977 to Mancuzo et al., entitled "Fuzzy Logic Filter for Reducing Noise and Sharpening Edges of Digital Image Signals" is directed to a filter that reduces noise using a fuzzy logic comparison unit in two noise reduction circuits.

De-ringing is another common post-processing method used to remove artifacts. U.S. Pat. No. 5,819,035 to Devaney et al., entitled "Post-filter for Removing Ringing Artifacts of DCT Coding" is directed to a post-filter that performs anisotropic diffusion filtering on decoded data. U.S. Pat. No. 5,850,294 to Apostolopoulos et al., entitled "Method and Apparatus for Post-processing Images" is directed to reducing visual artifacts through separate detection, mapping, and smoothing functions. The Apostolopoulos method employs DCT-domain detection rather than edge detection in the pixel domain. U.S. Pat. No. 5,883,983 to Yee et al., entitled "Adaptive Post-processing System for Reducing Blocking Effects and Ringing Noise in Decompressed Image Signals" is directed to an adaptive filtering method that uses a binary edge map and filters using various weighting factors to generate the filtered pixel value. One of the drawbacks of known de-ringing filters is that they can result in blurring of the true edges while removing the ringing artifacts.

BRIEF SUMMARY OF THE INVENTION

Although both edge sharpening and de-ringing are known, prior to the present invention they have never been efficiently combined in a single filter that is streamlined and computationally less expensive than using separate edge sharpening and de-ringing filters. The present invention in its preferred embodiments shares data between modules and reuses previous calculations for efficient operation. The present invention seeks to reduce the redundancy involved in separately carrying out edge sharpening and de-ringing. Experimentally, the present invention yields results that are superior to several known de-ringing filters.

The present invention is directed to a filter for post-processing digital images and videos, having an edge mapper, a pixel sorter, and an adaptive filter that simultaneously performs de-ringing and edge sharpening. Combining modules and code simplifies hardware design. Sharing at least some data that has been previously calculated among modules increases speed and efficiency. Thus, in its preferred embodiments, the combined filter is computationally simpler than known methods and can achieve removal of ringing artifacts and sharpening of true edges at the same time.

The edge mapping, de-ringing, and edge sharpening stages of the present invention preferably share data and reuse previous calculations for efficient operation.

The present invention also includes a preferred method of simultaneously de-ringing and edge sharpening digital images and videos.

The foregoing and other objectives, features, and advantages of the invention will be more readily understood upon consideration of the following detailed description of the invention, taken in conjunction with the accompanying drawings.

DETAILED DESCRIPTION OF THE INVENTION

The present invention presents simple and effective methods and systems for post-processing decoded images by combining separate filtering operations into a single filter. It sharpens true edges and removes distortion from decoded images that typically contain inaccurate visual edges and ringing artifacts. In a post-processing system, the present invention preferably identifies modules common to de-ringing and edge sharpening functions and reuses previously computed data to streamline computational needs and achieve adaptive filtering of an image signal. Reducing redundancy makes this system computationally more efficient than separate de-ringing and edge sharpening filters.

Figure 1:
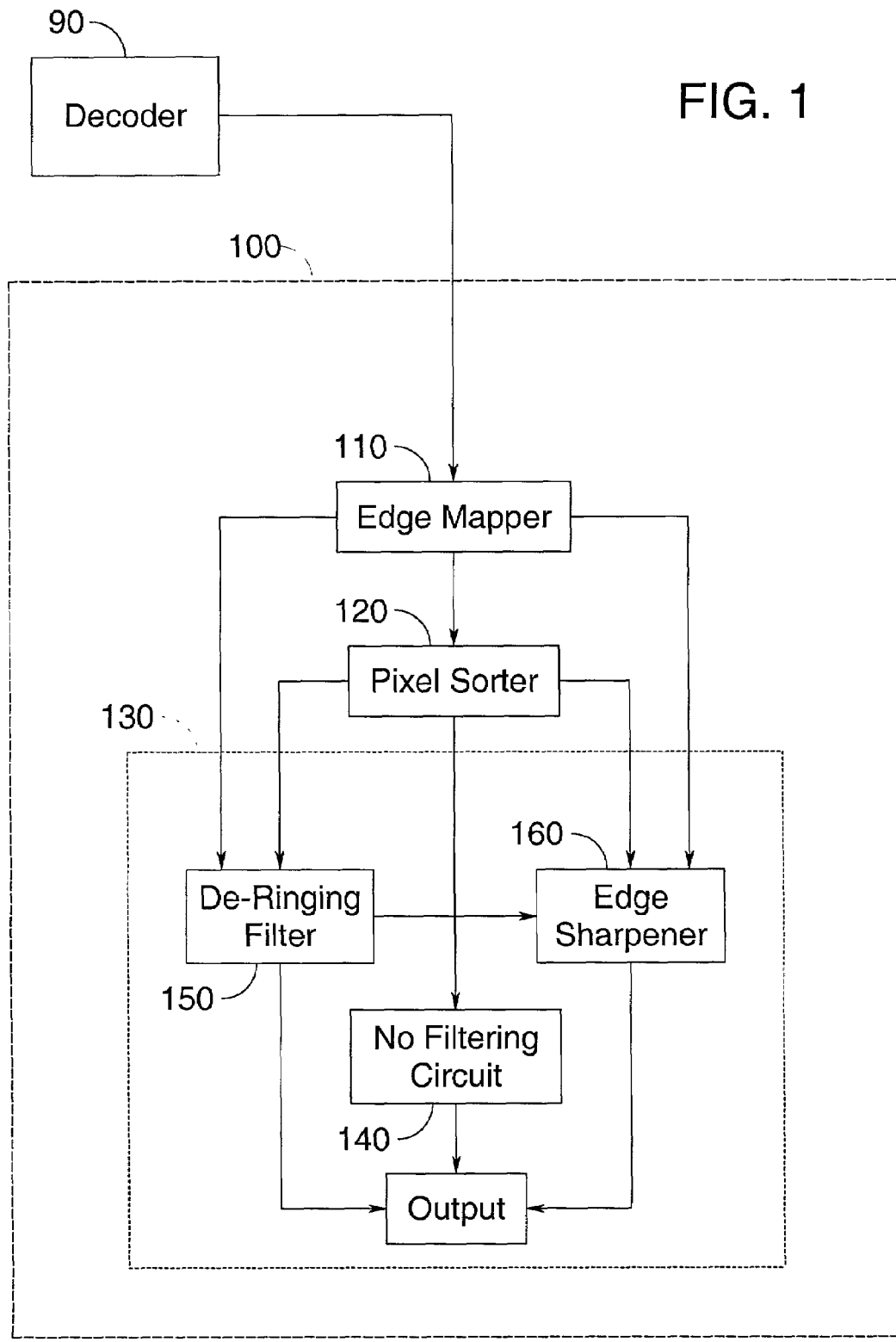
FIG. 1 is a block diagram of the components of one preferred embodiment of the present invention.

FIG. 1 shows the basic exemplary modules and stages of the present invention in relation to a typical image decoder. A decoder 90, such as a prior art decoder that may use a quantization scheme, decompresses a JPEG, MPEG, or other digital image and sends the decompressed image signal to the present invention 100. An edge mapper 110 receives the signal and creates a binary map of visual edges in the digital image, making the map available to a pixel sorter 120. The pixel sorter 120 preferably routes each pixel signal to one of three filtering possibilities within the adaptive filter 130: the pixel may be assigned to the de-ringing filter 150, to the edge sharpener 160, or to neither. The de-ringing filter will preferably be applied only to those pixels that are not on a true visual edge and are therefore more likely to be ringing artifacts. The edge sharpener will preferably be applied only to pixels that are on a visual edge. In some embodiments, some pixels will receive neither edge sharpening nor de-ringing filtering. Thus, filtering is adaptive.

Figure 2:
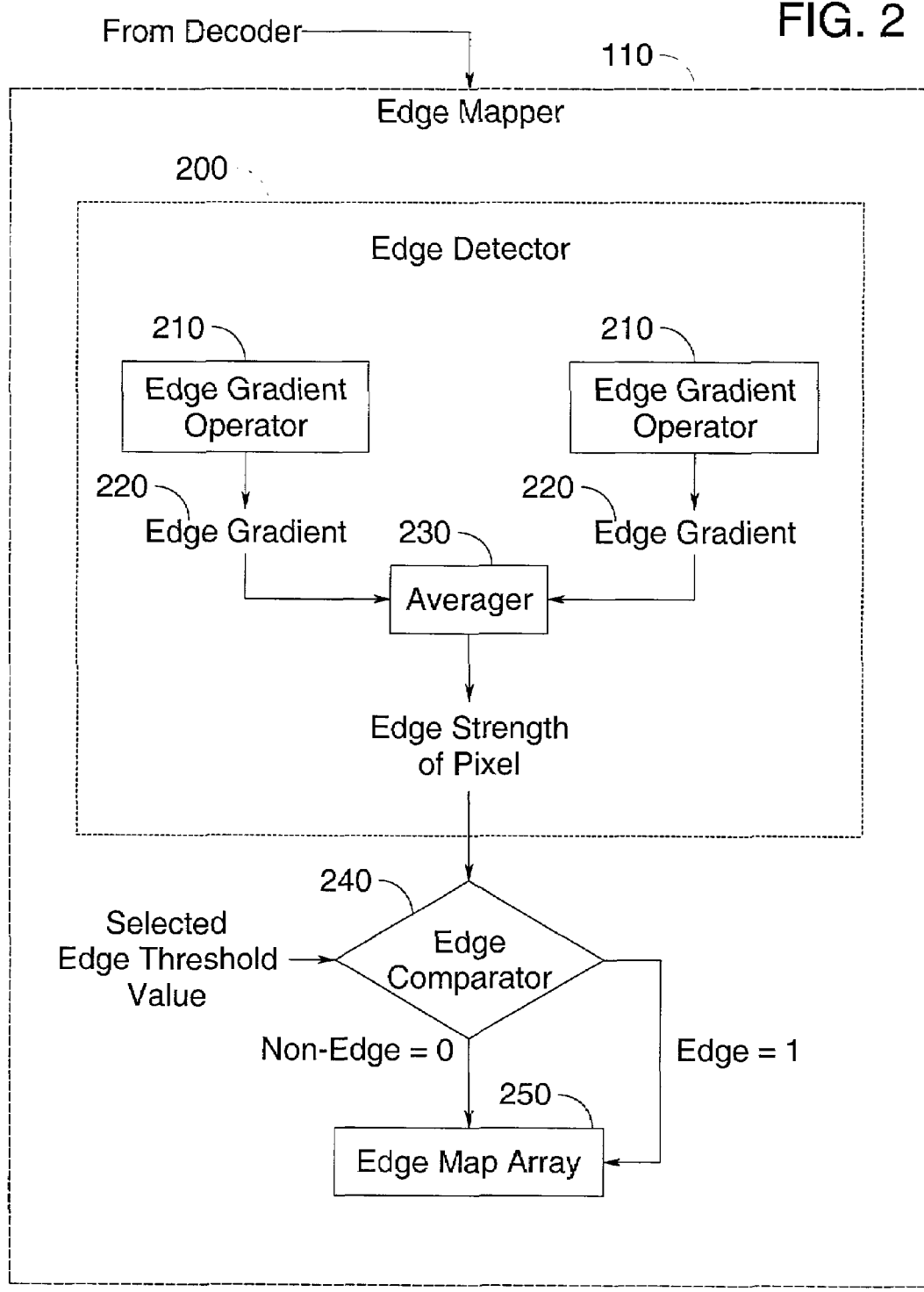
FIG. 2 is a block diagram of preferred components of an edge mapper of the present invention.

FIG. 2 shows an exemplary edge mapper 110 of the present invention in detail. An edge detector 200 calculates an edge value for each pixel in a digital image signal received from a decoder 90. The edge detector 200 may use an edge gradient operator 210 including but not limited to at least one Sobel, Prewitt, and/or Roberts edge gradient operator. The shown embodiment preferably uses Roberts operators of the form:

$$H_1 = \begin{bmatrix} 1 & 0 \\ 0 & -1 \end{bmatrix} \quad H_2 = \begin{bmatrix} 0 & 1 \\ -1 & 0 \end{bmatrix}$$

in order to minimize computational requirements. The use of edge detection operators 210 to compute at least one edge gradient 220 for each pixel in a digital image is well known to a person having ordinary skill in the art.

The edge detector 200 of the present invention preferably computes multiple edge gradients 220 for each pixel. The absolute value of the gradients obtained may be averaged or otherwise weighted into an edge significance value ("EdgeStrength") by an averager 230. In C++ programming code, EdgeStrength for a given pixel is computed by:

$$\text{EdgeStrength}(i, j) = (|g_{H1}(i, j)| + |g_{H2}(i, j)|)/2;$$

where i and j are coordinates of a pixel within the digital image signal, and $g_{H1}(i, j)$ and $g_{H2}(i, j)$ are gradients returned by the Roberts operators for a pixel at coordinates (i, j).

The edge detector 200 then compares the EdgeStrength of a pixel to a selected threshold value ("EdgeThreshold") using an edge comparator 240. The value of EdgeThreshold, which may be determined experimentally, is selected to optimize the computation of an effective edge map array 250 for use in the later filtering stages. An EdgeThreshold value of 30 is preferred when using Roberts operators for edge detection.

The comparison of a pixel's edge gradient (EdgeStrength) to the selected EdgeThreshold value determines the pixel's edge classification. In one embodiment, if EdgeStrength is less than or equal to EdgeThreshold, then the pixel is classified as a pixel representing a visual non-edge and assigned an edge map value ("EdgeValue") of 0. If EdgeStrength is greater than EdgeThreshold, then the pixel is classified as a pixel representing a visual edge and assigned an edge map value ("EdgeValue") of 1. (The 0 and 1 EdgeValues are meant to be exemplary and may be switched or alternatives used in their place.) The EdgeValue of a pixel may be used immediately by other modules and filtering stages of the present invention, and/or the stored array of edge map values ("EdgeValue(i, j)") may be retained in a discrete step for later use.

In an exemplary C++ programming code embodiment of the invention, the comparison of EdgeStrength to EdgeThreshold and classification of pixels as pixels representing visual edges or pixels representing visual non-edges may be computed by:

```
if (EdgeStrength(i, j) > EdgeThreshold)
{
EdgeValue(i, j) = 1;
}
else
{
EdgeValue(i, j) = 0;
}.
```

Figure 3:
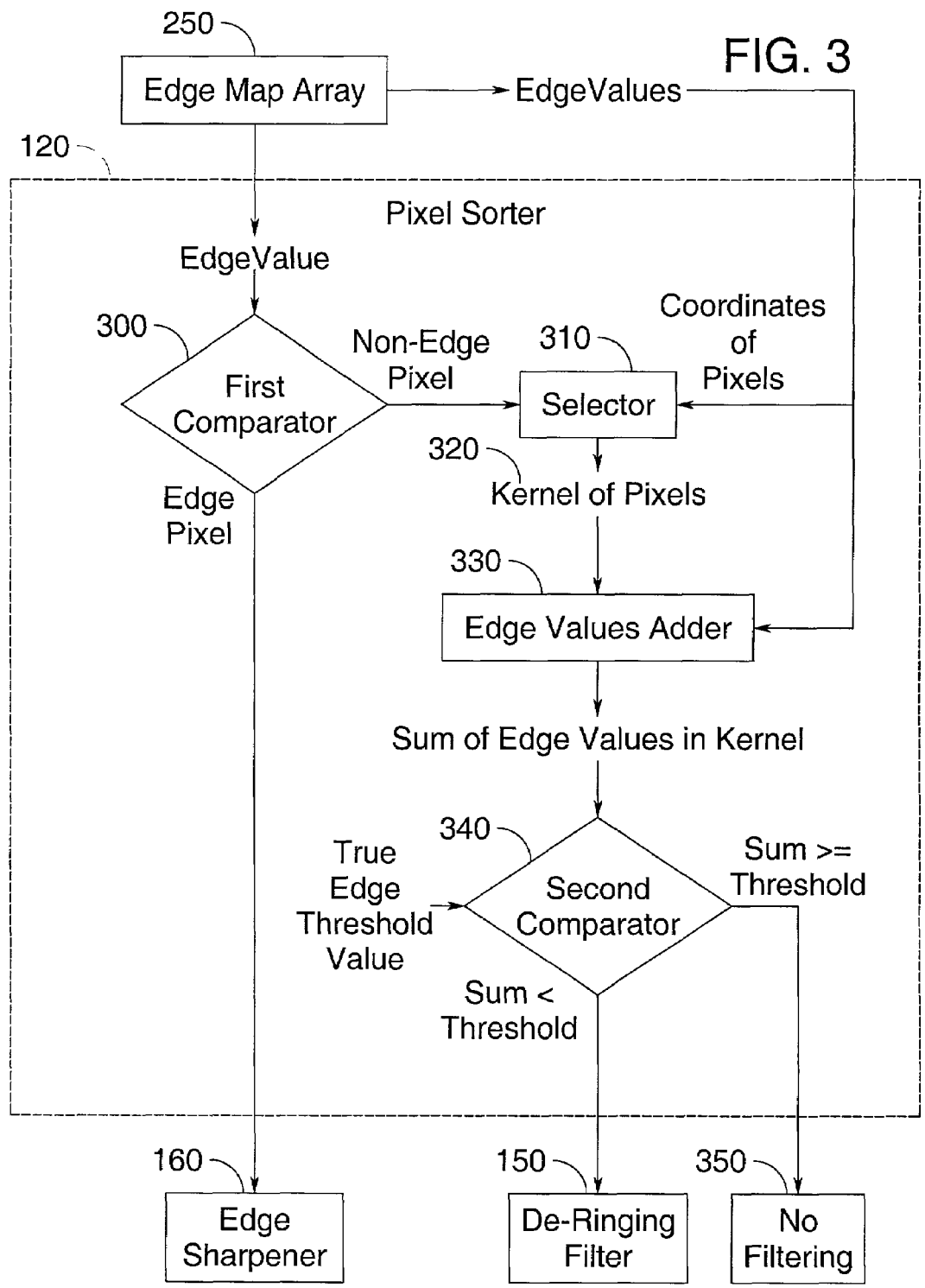
FIG. 3 is a block diagram of preferred components of a pixel sorter of the present invention.

FIG. 3 shows the pixel sorter 120 of the present invention in detail. The sorter preferably ensures that visual edges are not blurred and no true details lost. The pixel sorter 120 preferably accesses the edge map array 250 to retrieve the EdgeValue of the pixel being processed. A first sorting comparator 300 reads the edge map array 250 to determine whether the pixel being processed is a pixel representing a visual edge (EdgeValue=1). If it is, the pixel is routed to the edge sharpener 160.

If the pixel being processed is a pixel representing a visual non-edge (EdgeValue=0) then a selector 310 designates a group of pixels in a grid pattern ("kernel" 320) near each pixel being processed. The purpose of the kernel 320 is to provide the present invention with the visual characteristics of the pixels in the immediate vicinity of the pixel being processed, sometimes called a "region of support." For example, if a pixel being processed stands out from its neighboring pixels, and none of the pixels in the kernel 320 are pixels representing a visual edge, then the likelihood increases that the pixel being processed is manifesting noise, and should be filtered to a tone nearer the tone of its neighboring pixels.

A kernel 320 may be a group of pixels adjacent to, surrounding, or near the pixel being processed. For instance, if the pixel being processed is on the physical edge of the digital image, then the kernel 320 cannot consist of pixels completely surrounding the pixel being processed. The size of the kernel 320 may vary, but is preferably a 3×3 pixel grid with the pixel being processed in the center of the grid. Formulas that produce a kernel grid having a center pixel are used. Exemplary formulas are 2X+1 and 2Y+1 to define each side of the kernel 320. The pixel being processed is the center pixel in a grid produced by the exemplary formulas. Using 1 for X and Y yields a 3×3 grid; using 2 for X and Y yields a 5×5 grid, etc. A 2×2 pixel grid, for comparison, has no center position and cannot be generated by the 2X+1 and 2Y+1 formulas. Using 1 for X and Y avoids oversmoothing and loss of detail and also keeps the computational complexity low. During operation of the present invention, the kernel may be determined by incrementing the 2X+1 and 2Y+1 formulas in a "for" loop from −X to +X and from −Y to +Y.

The coordinates of the kernel 320 designated by the selector 310 may be used to access the edge map array 250 to determine the EdgeValues of each pixel in the kernel 320. The EdgeValues may be summed 330 to determine the likelihood that the kernel 320 contains a visual edge. In one embodiment, the sum of the EdgeValues from the edge map array 250 is compared by a second comparator 340 to a threshold value that indicates the presence of a true visual edge ("TrueEdgeThreshold"). If the sum of the EdgeValues is less than TrueEdgeThreshold, then it is presumed that the kernel 320 does not contain a visual edge. In one preferred embodiment, a 3×3 pixel grid is used, and TrueEdgeThreshold preferably has a value of 4. This means that if at least four of the nine pixels in the 3×3 grid were mapped by the edge detector 200 as pixels representing a visual edge, then it is assumed that the kernel 320 contains a visual edge. Other variations are possible for determining when a kernel contains a visual edge.

If the kernel 320 containing the pixel being processed contains a visual edge or at least has enough visual edge character to surpass the TrueEdgeThreshold selected value, and the pixel being processed is a visual non-edge pixel, then the pixel sorter 120 preferably classifies the pixel for no filtering 350 and routes the pixel neither to the de-ringing filter 150 nor to the edge sharpener 160. The sorter thereby ensures that the actual edges in the kernel are not blurred and no true details are lost.

If the kernel 320 containing the pixel being processed does not contain a visual edge or at least has so little visual edge character that the TrueEdgeThreshold selected value is not surpassed, then the pixel sorter 120 preferably routes the pixel being processed to the de-ringing filter 150 since the pixel does not lie in a kernel that may contain a true visual edge. Table 1 summarizes filtration categories to which the pixel sorter 120 may assign individual pixels.

TABLE 1

| Type of Pixel | Type of Filtering Assigned by Pixel Sorter 120 |
|---|---|
| Visual non-edge pixel substantially surrounded by visual non-edge pixels | De-Ringing |
| Visual non-edge pixel substantially surrounded by visual edge pixels | No Filtering |
| Visual edge pixel | Edge sharpening |

One preferred embodiment of the pixel sorter 120 is the following exemplary C++ programming code routine:

```
SumKernelPixels = 0;
for (ix = -X; ix <= X; ix++)
for (iy = -Y; iy <= Y; iy++)
{
SumKernelPixels += EdgeValue(i + ix, j + jy);
}
if ((SumKernelPixels < TrueEdgeThreshold) && (EdgeValue(i, j) = 0))
{Apply De-ringing Filter}
else if (EdgeValue(i, j) = 1)
{Apply Edge Sharpener}.
```

In this code, (2X+1)(2Y+1) is the kernel size, and TrueEdgeThreshold is a number less than (2X+1)(2Y+1) (i.e., is a number less than the total number of pixels within the kernel). Only those pixels that satisfy one of the criteria in the shown code will pass through the next stage of actual filtering by the de-ringing filter 150 or the edge sharpener 160.

Figure 4:
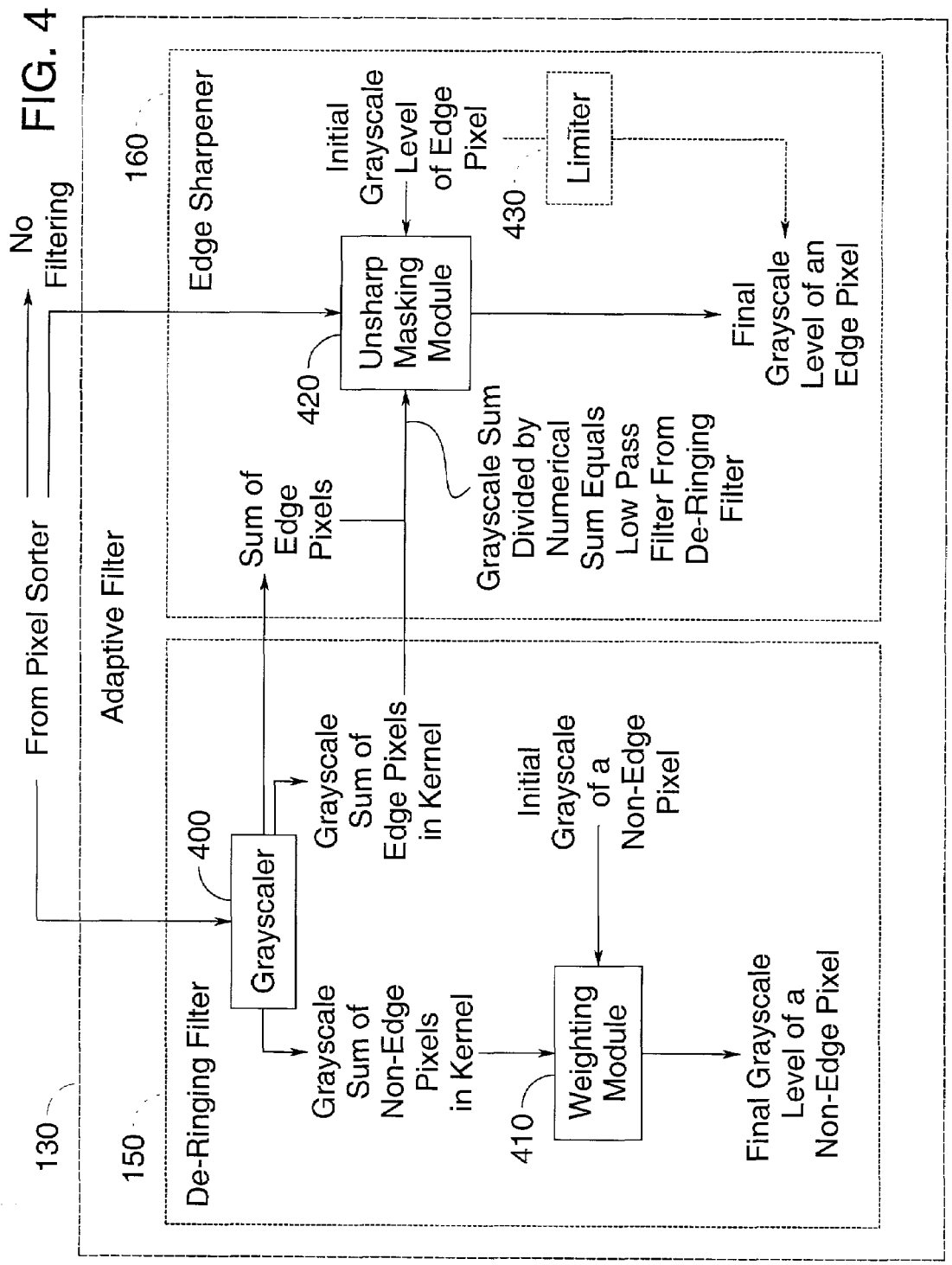
FIG. 4 is a block diagram of preferred components of an adaptive filter of the present invention.

FIG. 4 shows an exemplary adaptive filter 130 of the present invention in detail. The adaptive filter 130 includes a de-ringing filter 150, an edge sharpener 160, and a no filtering circuit for passing pixel signals that receive no filtering through the adaptive filter 130.

The de-ringing filter 150 receives pixel signals classified for de-ringing by the pixel sorter 120 of the previous stage. Known de-ringing filters adaptively choose a filtering mask based on a pixel's neighboring pixels. A different mask is chosen for each pixel, and the determination of this mask needs several comparison and branching decisions. This can result in slow operation on certain processor architectures. The preferred de-ringing filter of the present invention has lower complexity compared with these known de-ringing filters. Moreover, since the de-ringing filter of the present invention is combined with an edge sharpening filter and supporting modules, the efficiency of the de-ringing filter is enhanced even further by using computation results already performed by the other filters and modules.

The de-ringing filter 150 preferably includes a grayscaler 400 that reads the grayscale values of all pixels in a kernel being processed. The gray scale is a series of gray tones, which range from true black to true white, usually but not always expressed in 255 steps. The grayscaler 400 sums the grayscale values of all pixels representing visual edges in the kernel ("EdgeGrayscaleSum") and sums the grayscale values of all pixels representing visual non-edges in the kernel ("NonEdgeGrayscaleSum").

In an exemplary C++ programming code embodiment of the grayscaler, the computation of the number of pixels representing a visual edge in the kernel ("SumEdgePixels") may be computed at the same time that the grayscale values of the pixels in the kernel are summed:

```
Kernel = (2 * X + 1) * (2 * Y + 1);
NonEdgeGrayscaleSum = EdgeGrayscaleSum = 0;
for(ix = -X; ix <= X; ix++)
for(iy = -Y; jy <= Y; iy++)
{
NonEdgeGrayscaleSum += (1 - EdgeValue(i + ix, j + jy)) * GrayScale (i + ix, j + jy);
EdgeGrayscaleSum += EdgeValue(i + ix, j + jy) * GrayScale(i + ix, j + jy);
SumEdgePixels += EdgeValue(i + ix, j + jy);
}
``` where Kernel is the number of pixels in the kernel containing the pixel being processed, (2X+1) and (2Y+1) define the sides of the kernel, GrayScale is the grayscale value of a pixel, NonEdgeGrayscaleSum is the sum of the grayscale values of the pixels representing visual non-edges in the kernel, EdgeGrayscaleSum is the sum of the grayscale values of the pixels representing visual edges in the kernel, EdgeValue is the edge map value (0 or 1) assigned to each pixel by the edge mapper 110, SumEdgePixels is the number of pixels representing visual edges in the kernel, i and j are pixel coordinates within the digital image, and ix and iy are loop incrementing variables. A lookup table may optionally be used to store the values of SumEdgePixels for later use.

The de-ringing filter 150 may also include a weighting module 410 that alters the grayscale value of the pixel being processed in direct proportion to an average grayscale value of all the other pixels representing visual non-edges in the kernel. This weighting of the grayscale of a pixel based on the grayscale characteristics of adjacent pixels representing visual non-edges is one method of performing de-ringing. One exemplary method of performing the weighting function is by calculating the sum of grayscale values from each pixel representing a visual non-edge in the kernel and dividing the sum by the number of all pixels representing visual non-edges in the kernel.

In an exemplary C++ programming code embodiment of the weighting module, only the summed grayscale values of the pixels representing visual non-edges (NonEdgeGrayscaleSum) are considered, the grayscale values of the pixels representing visual edges do not enter into the computation. The size of the kernel surrounding each pixel being operated on by the de-ringing filter 150 (preferably eight pixels with the pixel being processed being the ninth) does not change during computations, but a unique NonEdgeGrayscaleSum value is computed by the grayscaler 400 for each kernel. The number of pixels in a kernel that represent visual non-edges is used for averaging the sum of the grayscale values, and is given by (Kernel−SumEdgePixels). The grayscaler 400 does not calculate the number of pixels representing visual non-edges by adding EdgeValues, because the EdgeValues of pixels representing visual non-edges are all 0 and cannot be added to give a count. The final grayscale value assigned to a pixel for display may be performed in C++ by:

FinalGrayScale(*i*, *j*)=(1/(Kernel−SumEdgePixels))*NonEdgeGrayscaleSum;

where FinalGrayScale is the grayscale value for final display of each pixel being processed, Kernel is the number of pixels in the kernel, SumEdgePixels is the number of pixels representing a visual edge in the kernel, NonEdgeGrayscaleSum is the sum of the grayscale values of the pixels representing visual non-edges in the kernel, and i and j are pixel coordinates. Although this embodiment performs de-ringing by a simple averaging calculation, other methods of weighting a final grayscale value may be used with the present invention.

The adaptive filter 130 also includes an edge sharpener 160. One preferred method of edge sharpening is unsharp masking. The edge sharpener 160 preferably includes an unsharp masking module 420 that sharpens visual edges by adding a high pass filtered image of the original digital image to relevant pixels in the original image to yield a final edge sharpened image.

The amount of edge sharpening may be controlled by using an edge sharpening factor ("$\lambda$") for determining the strength of the high pass filtered image to be added to the original image. $\lambda$ preferably has a value between 0.01 and 0.7 and controls the amount of edge sharpening. A higher $\lambda$ value can result in edge saturation and added artifacts. A combined clipping and saturation avoidance stage may optionally be added to ensure that there are no added artifacts. Values of $\lambda$=0.5, 0.25 and 0.125 are also preferable choices since efficient implementation may be achieved by simple shifting.

A high pass filtered image may be obtained by subtracting a low pass filtered image from a scaled original image. This is desirable since a low pass filtered image is readily available from other calculations already performed by the grayscaler 400. For example, dividing the summed grayscale values of the pixels representing visual edges in a kernel (EdgeGrayscaleSum) by the number of pixels representing visual edges in the kernel (SumEdgePixels) gives a low pass filtered image suitable for this embodiment. The low pass filtered image may optionally be multiplied by the edge sharpening factor $\lambda$ to control the degree of edge sharpening. A computationally efficient method of edge sharpening may be derived algebraically:

$$\text{Sharpened Image} = (\text{Original Image}) + (\lambda)(\text{HighPass Image})$$
$$" \quad " = (\text{Original Image}) + (\lambda)(\text{Original Image} - \text{Low Pass Image})$$
$$" \quad " = (\text{Original Image}) + (\lambda)(\text{Original Image}) - (\lambda)(\text{Low Pass Image})$$
$$" \quad " = (1 + \lambda)(\text{Original Image}) - (\lambda)(\text{Low Pass Image})$$

The term (1+$\lambda$)(Original Image) provides a scaled version of the original digital image from which a low pass filtered image is subtracted to obtain the sharpened image.

A preferred edge sharpener embodiment using unsharp masking may be performed by the following C++ programming code (together with the code for the de-ringing filter):

FinalGrayScale(*i*, *j*)=(1+$\lambda$)*Grayscale(*i*, *j*)−(1/SumEdgePixels)*$\lambda$*EdgeGrayscaleSum where GrayScale(i, j) is the grayscale value of the pixel at coordinates i and j before edge sharpening, FinalGrayScale (i, j) is the grayscale value of the edge sharpened pixel at coordinates i and j, $\lambda$ is the edge sharpening factor to control the strength edge sharpening, SumEdgePixels is the number of pixels representing visual edges in the kernel calculated by the grayscaler 400, and EdgeGrayscaleSum is the sum of the grayscale values of the pixels representing visual edges in the kernel calculated by the grayscaler 400. The FinalGrayScale(i, j) image may optionally be clipped.

The edge sharpener 160 may also include an optional limiter 430 for turning off the edge sharpener 160 if a visual edge is already too strong. One preferred method of determining whether a visual edge is already too strong is to compare EdgeStrength, which is calculated by the edge mapper 110, to a predetermined threshold. If EdgeStrength for a given pixel is greater than the threshold, the edge sharpener will not operate on the pixel. This may avoid saturation of visual edges that are already strong enough.

The various stages and modules of the present invention are discussed as discrete units for ease of explanation, but the different modules are preferably combined and share data in actual embodiments. For example, the code for the pixel sorter 120 and the adaptive filter 130 are combined in preferred embodiments. Combining modules and code simplifies hardware design, and the sharing of data that has been previously calculated by a different module or code fragment increases speed and efficiency.

Figure 5:
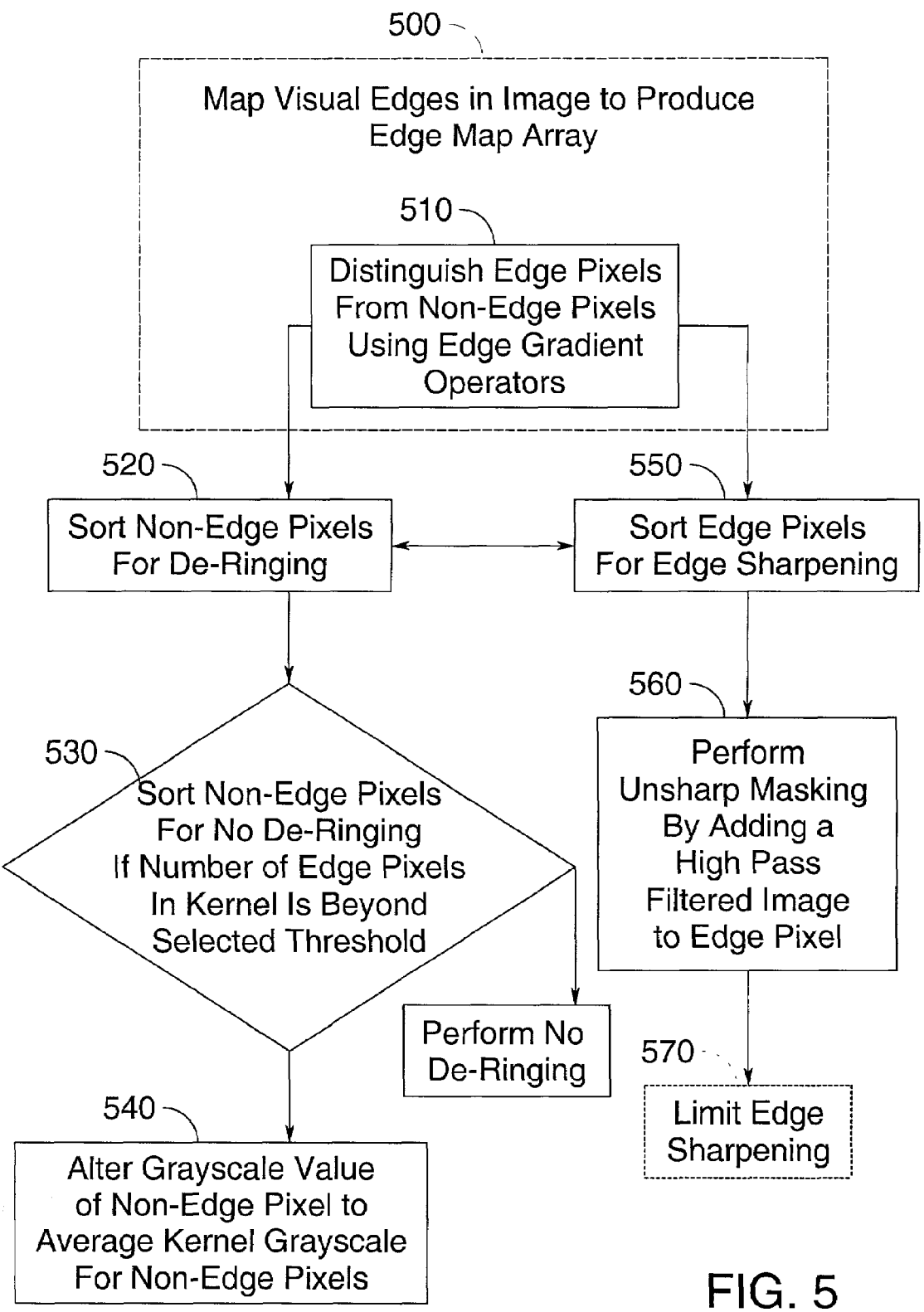
FIG. 5 is a flowchart of a preferred method of the present invention.

FIG. 5 shows one preferred method of filtering a digital image. Visual edges in the digital image are mapped to produce an edge map 500. Pixels representing a visual edge may be distinguished from pixels representing a visual non-edge by using at least one edge gradient operator 510. Pixels representing visual non-edges are preferably sorted for de-ringing 520. A pixel representing a visual non-edge may be sorted for no filtering if the number of pixels representing visual edges in a kernel of pixels surrounding the pixel being processed is greater than a selected edge threshold. If the pixel representing a visual non-edge is sorted for de-ringing, the grayscale value of the pixel is altered in proportion to the averaged grayscale values of pixels in the kernel 540. The de-ringing step preferably uses at least some data previously calculated from the edge mapping and pixel sorting steps. Pixels representing visual edges are preferably sorted for edge sharpening 550. One preferred method of edge sharpening includes unsharp masking by adding a high pass filtered image to the pixel representing a visual edge 560. The edge sharpening step preferably uses at least some data previously calculated from the edge mapping, pixel sorting, and de-ringing steps. Edge saturation may be prevented by limiting edge sharpening 570 of pixels having high edge strength (as calculated by the edge mapper).

Figure 6:
FIG. 6 is a decompressed black and white image of flowers that has ringing artifacts.
Figure 7:
FIG. 7 is a portion of the image of FIG. 6 magnified 220%.
Figure 8:
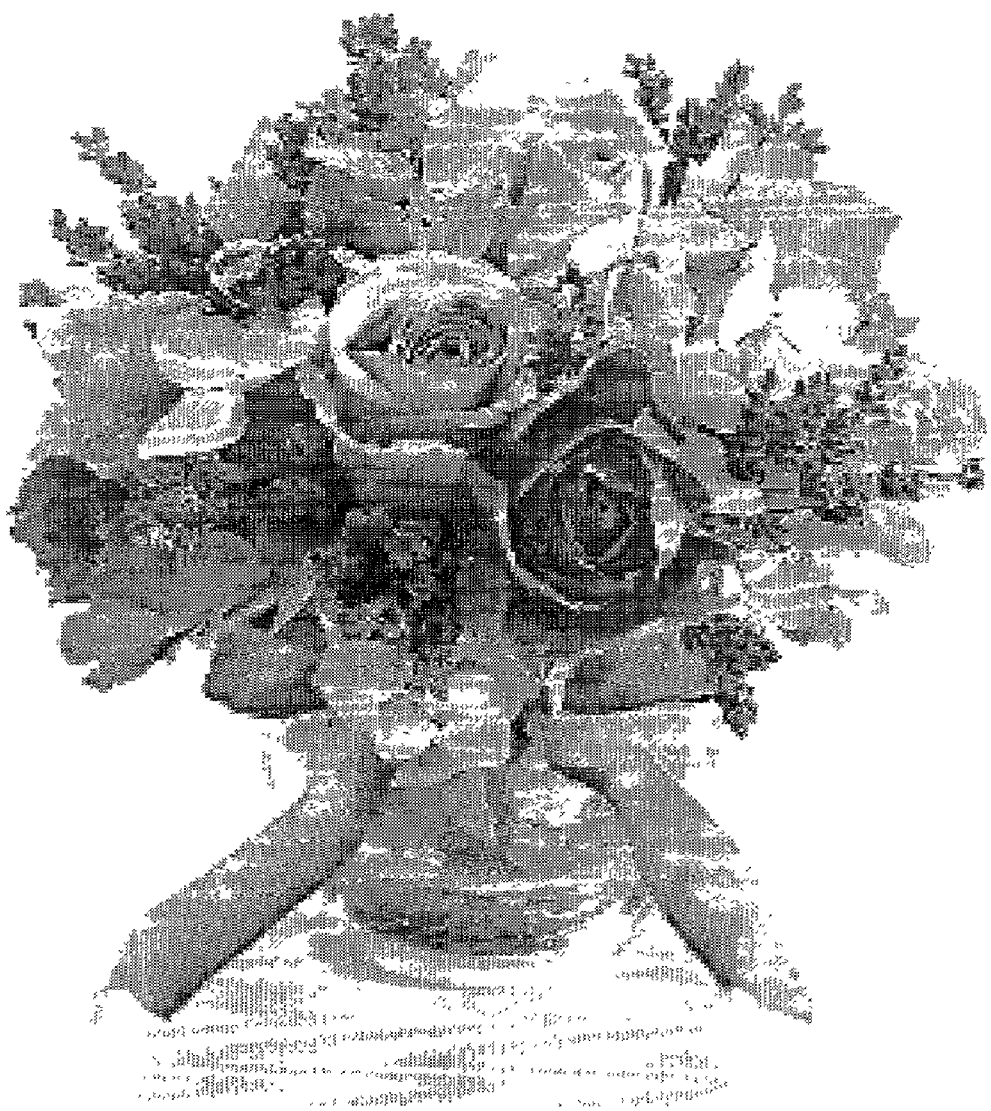
FIG. 8 is the image of FIG. 6 after post-processing with a known de-ringing filter.
Figure 9:
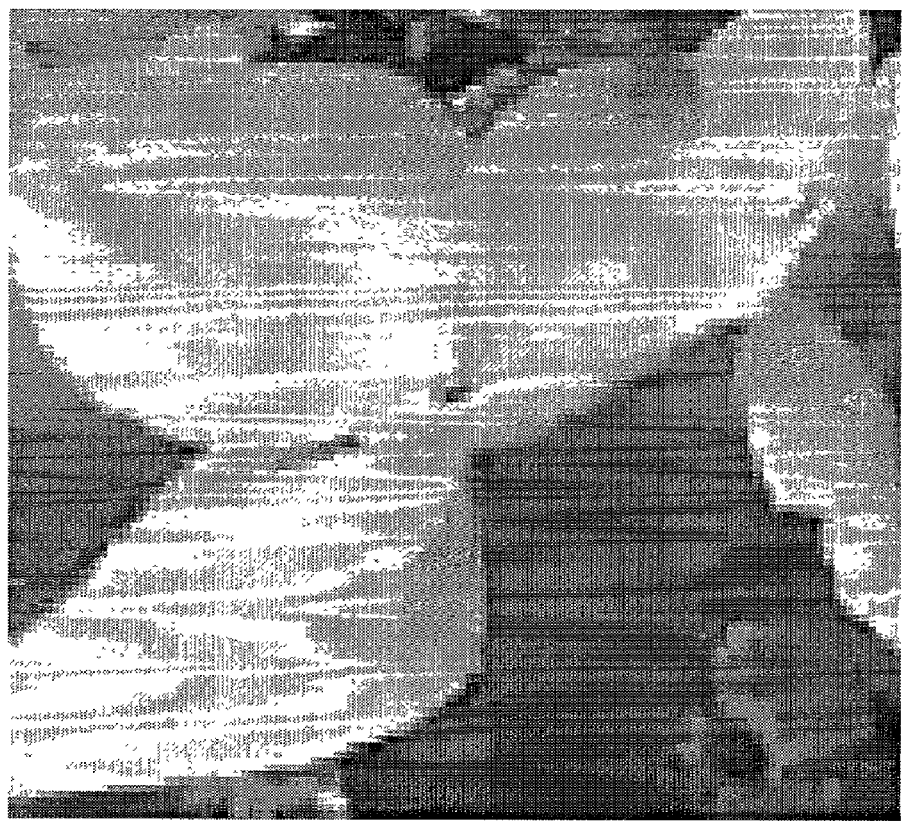
FIG. 9 is a portion of the image of FIG. 8 magnified 220%.
Figure 10:
FIG. 10 is the image of FIG. 6 after post-processing with a preferred combined de-ringing and edge sharpening filter of the present invention.
Figure 11:
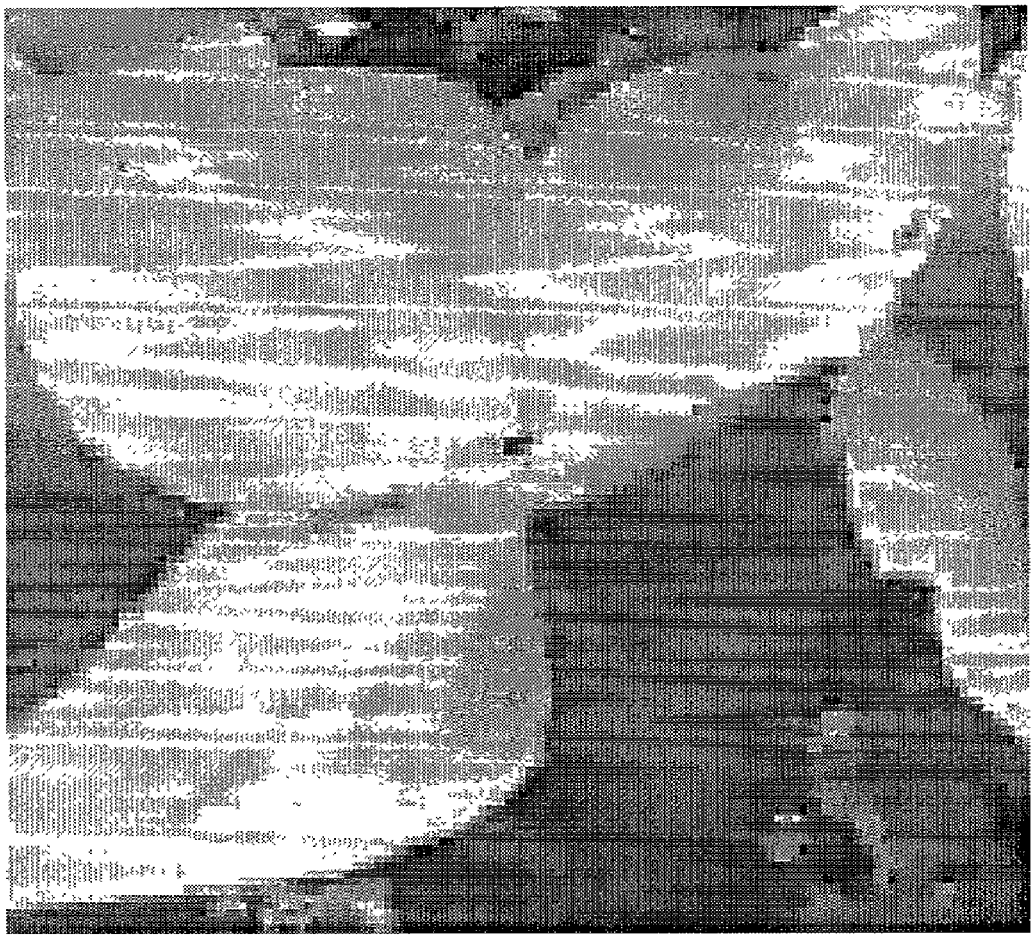
FIG. 11 is a portion of the image of FIG. 10 magnified 220%.

Results obtained from the present invention and results obtained from a typical known "de-ringing only" filter are shown in FIGS. 6–11. FIGS. 6–7 show a decompressed image that has ringing artifacts. Blockiness is evident throughout the images. Unsharp edges are also noticeable. FIGS. 8–9 show the images of FIGS. 6–7 after post-processing using a conventional "de-ringing only" filter. There is less blockiness in FIGS. 8–9 than in FIGS. 6–7, but there is a great loss of detail—especially noticeable on the petals of the flower. FIGS. 10–11 show the images of FIGS. 6–7 after post-processing using the combined de-ringing and edge sharpening filter of the present invention. The details on the petals of the flower are more enhanced in FIGS. 10–11 than in FIGS. 8–9, and the ringing artifacts in FIGS.

6–7 are gone. FIGS. 10–11 demonstrate that some of the blocking artifacts evident in FIGS. 6–7 and in FIGS. 8–9 are also removed by the present invention.

It should be noted that although this invention is set forth in terms of a "single filter," conceptually the "single filter" might be divided into a plurality of interlinked elements such as algorithms, modules, subroutines, or processors. Further, each of the elements may be further divided into a plurality of processors.

It should also be noted that several of the features of the present invention may be replaced with known features. For example, the de-ringing filter 150 may be replaced with a known de-ringing filter or the edge sharpener 160 may be replaced with a known edge sharpener. Although this would make the invention computationally more expensive, it would still fall within the scope of the invention.

The terms and expressions that have been employed in the foregoing specification are used as terms of description, not of limitation, and are not intended to exclude equivalents of the features shown and described or portions of them. The scope of the invention is defined and limited only by the claims that follow.

What is claimed is:

1. A filter system for post-processing a digital image, said digital image having a plurality of visual-edge pixels and a plurality of visual non-edge pixels, said filter system comprising:
   (a) an edge mapper for producing a binary map of said visual edge pixels and said visual non-edge pixels;
   (b) a pixel sorter comprising;
      (i) said pixel sorter for reading said binary map; and
      (ii) said pixel sorter for assigning to each pixel a type of filtration to be provided by said filter system, said type of filtration selected from the group consisting of:
         (A) de-ringing filtration;
         (B) edge sharpening filtration; and
         (C) no filtration;
   (c) an adaptive filter for receiving output from said pixel sorter; and
   (d) said adaptive filter comprising:
      (i) a de-ringing module for post-processing said visual non-edge pixels assigned a de-ringing filtration type of filtration; and
      (ii) an edge sharpener for post-processing said edge pixels assigned an edge sharpening filtration type of filtration.

2. The filter system of claim 1, said edge mapper further comprising:
   (a) an edge detector comprising:
      (i) said edge detector for calculating intensity gradients for each pixel in said digital image;
      (ii) said edge detector for assigning a first edge value to each edge pixel based on said intensity gradients; and
      (iii) said edge detector for assigning a second edge value to each non-edge pixel based on said intensity gradients; and
   (b) a memory storage array for storing said first edge value for each edge pixel and for storing said second edge value for each non-edge pixel.

3. The filter system of claim 2, wherein said edge detector uses at least one edge detection operator to calculate said intensity gradients selected from the group of edge detection operators consisting of:
   (a) a Sobel edge detection operator;
   (b) a Prewitt edge detection operator; and
   (c) a Roberts edge detection operator.

4. The filter system of claim 2, wherein said edge detector uses Roberts edge detection operators $H_1$ and $H_2$ of the form:

$$H_1 = \begin{bmatrix} 1 & 0 \\ 0 & -1 \end{bmatrix} \quad H_2 = \begin{bmatrix} 0 & 1 \\ -1 & 0 \end{bmatrix}.$$

5. The filter system of claim 2, said edge detector for executing an edge value subroutine for calculating said first edge value for each visual edge pixel and said second edge value for each visual non-edge pixel, said edge value subroutine further comprising:
   (a) at least one edge detection operator for calculating intensity gradients for each pixel in said digital image;
   (b) an i variable for storing a horizontal coordinate of each pixel in said digital image;
   (c) a j variable for storing a vertical coordinate of each pixel in said digital image;
   (d) $g_{H1}(i, j)$ and $g_{H2}(i, j)$ variables for storing intensity gradients calculated by said at least one edge detection operator;
   (e) an EdgeStrength(i, j) variable for storing an average of said intensity gradients for each pixel in said digital image;
   (f) an EdgeThreshold variable for storing a selectable threshold value for defining a true visual edge containing said visual edge pixels; and
   (g) an EdgeValue(i, j) variable for storing said first edge value for each visual edge pixel and said second edge value for each visual non-edge pixel;
   (h) wherein said edge value subroutine is defined as:

```
EdgeStrength(i, j) = (|g_H1(i, j)| + |g_H2(i, j)|)/2;
if (EdgeStrength(i, j) > EdgeThreshold)
{
EdgeValue(i, j) = 1;
}
else
{
EdgeValue(i, j) = 0;
}.
```

6. The filter system of claim 2, said pixel sorter further comprising:
   (a) a first comparator for sorting said visual edge pixels from said visual non-edge pixels;
   (b) a selector comprising:
      (i) said selector receiving output from said first comparator; and
      (ii) said selector designating a kernel of pixels near each pixel being processed; and
   (c) a second comparator comprising:
      (i) said second comparator receiving output from said selector; and
      (ii) said second comparator assigning types of filtration to each pixel being processed based at least in part on a sum of first edge values and second edge values of said pixels in said kernel of pixels.

7. The filter system of claim 6, wherein said kernel of pixels is a grid of pixels in which said pixel being processed is a center pixel in said grid of pixels.

8. The filter system of claim 6, wherein said second comparator is for applying de-ringing filtration by said de-ringing module to said pixel being processed if said pixel being processed is a visual non-edge pixel and said sum of first edge values and second edge values of said pixels in said kernel of pixels is less than a predetermined threshold value defining a true visual edge.

9. The filter system of claim 6, wherein said first comparator is for applying edge sharpening filtration by said edge sharpener to said pixel being processed if said pixel being processed is a visual edge pixel.

10. A filter system for post-processing a digital image, said digital image having a plurality of visual-edge pixels and a plurality of visual non-edge pixels, said filter system comprising:
 (a) an edge mapper for producing a binary map of said visual edge pixels and said visual non-edge pixels, said edge mapper further comprising:
  (i) an edge detector comprising:
   (A) said edge detector for calculating intensity gradients for each pixel in said digital image;
   (B) said edge detector for assigning a first edge value to each edge pixel based on said intensity gradients; and
   (C) said edge detector for assigning a second edge value to each non-edge pixel based on said intensity gradients; and
  (ii) a memory storage array for storing said first edge value for each edge pixel and for storing said second edge value for each non-edge pixel;
 (b) a pixel sorter comprising;
  (i) said pixel sorter for reading said binary map;
  (ii) said pixel sorter for assigning to each pixel a type of filtration to be provided by said filter system;
  (iii) a first comparator for sorting said visual edge pixels from said visual non-edge pixels;
  (iv) a selector comprising:
   (A) said selector receiving output from said first comparator; and
   (B) said selector designating a kernel of pixels near each pixel being processed; and
  (v) a second comparator comprising:
   (A) said second comparator receiving output from said selector;
   (B) said second comparator assigning types of filtration to each pixel being processed based at least in part on a sum of first edge values and second edge values of said pixels in said kernel of pixels; and
   (C) said second comparator applying no de-ringing filter and no edge sharpener to said pixel being processed if said pixel being processed is a visual non-edge pixel based on said second edge value and said sum of first edge values and second edge values of said pixels in said kernel of pixels is not less than a predetermined threshold value defining a true visual edge;
 (c) an adaptive filter for receiving output from said pixel sorter; and
 (d) said adaptive filter comprising:
  (i) a de-ringing module for post-processing said visual non-edge pixels; and
  (ii) an edge sharpener for post-processing said edge pixels.

11. The filter system of claim 6, said filter system further comprising:
 (a) a grayscaler;
 (b) said grayscaler for summing grayscale values of all visual edge pixels in said kernel of pixels; and
 (c) said grayscaler summing grayscale values of all visual non-edge pixels in said kernel of pixels.

12. A filter system for post-processing a digital image, said digital image having a plurality of visual-edge pixels and a plurality of visual non-edge pixels, said filter system comprising:
 (a) an edge mapper for producing a binary map of said visual edge pixels and said visual non-edge pixels, said edge mapper further comprising:
  (i) an edge detector comprising:
   (A) said edge detector for calculating intensity gradients for each pixel in said digital image;
   (B) said edge detector for assigning a first edge value to each edge pixel based on said intensity gradients; and
   (C) said edge detector for assigning a second edge value to each non-edge pixel based on said intensity gradients; and
  (ii) a memory storage array for storing said first edge value for each edge pixel and for storing said second edge value for each non-edge pixel;
 (b) a pixel sorter comprising;
  (i) said pixel sorter for reading said binary map;
  (ii) said pixel sorter for assigning to each pixel a type of filtration to be provided by said filter system; and
  (iii) said pixel sorter further comprising:
   (A) a first comparator for sorting said visual edge pixels from said visual non-edge pixels;
   (B) a selector comprising:
    (1) said selector receiving output from said first comparator; and
    (2) said selector designating a kernel of pixels near each pixel being processed; and
   (C) a second comparator comprising:
    (1) said second comparator receiving output from said selector; and
    (2) said second comparator assigning types of filtration to each pixel being processed based at least in part on a sum of first edge values and second edge values of said pixels in said kernel of pixels;
 (c) an adaptive filter for receiving output from said pixel sorter, said adaptive filter for executing a grayscale subroutine for counting said number of visual edge pixels in said kernel of pixels, for summing grayscale values of all visual edge pixels in said kernel of pixels, and for summing grayscale values of all visual non-edge pixels in said kernel of pixels, said grayscale subroutine further comprising:
  i an i variable for storing a horizontal coordinate of each pixel in said digital image;
  ii a j variable for storing a vertical coordinate of each pixel in said digital image;
  iii an ix integer variable for counting a horizontal distance away from said i variable;
  iv an jy integer variable for counting a vertical distance away from said j variable;
  v an X integer variable for defining a length of a horizontal edge of said kernel of pixels;
  vi a Y integer variable for defining a length of a vertical edge of said kernel of pixels;
  vii a Kernel variable for storing a count of pixels in said kernel of pixels obtained by multiplying said X integer by said Y integer;
  viii a NonEdgeGrayscaleSum variable for storing said sum of grayscale values of all visual non-edge pixels in said kernel of pixels;

ix an EdgeGrayscaleSum variable for storing said sum of grayscale values of all visual edge pixels in said kernel of pixels;

x an EdgeValue(i, j) variable for storing said first edge value for each visual edge pixel and for storing said second edge value for each visual non-edge pixel;

xi a Grayscale(i, j) variable for storing a grayscale value of each pixel located at coordinates i and j in said digital image; and xii a SumEdgePixels variable for counting a number of said visual edge pixels in said kernel of pixels;

xiii wherein said grayscale subroutine is defined as:

```
Kernel = (2 * X + 1) * (2 * Y + 1);
NonEdgeGrayscaleSum = EdgeGrayscaleSum = 0;
for(ix =- X; ix <= X; ix++)
for(jy =- Y; jy <= Y; jy++)
{
NonEdgeGrayscaleSum += (1 - EdgeValue(i + ix, j + jy)) *
GrayScale(i + ix, j + jy);
EdgeGrayscaleSum += EdgeValue(i + ix, j + jy) * GrayScale(i +
ix, j + jy);
SumEdgePixels += EdgeValue(i + ix, j + jy);
}.
```

(d) said adaptive filter comprising:
(i) a de-ringing module for post-processing said visual non-edge pixels; and
(ii) an edge sharpener for post-processing said edge pixels.

13. The filter system of claim 1, said de-ringing module further comprising a weighting module; said weighting module altering a grayscale value of each visual non-edge pixel for final display in direct proportion to an average grayscale value of all visual non-edge pixels in a kernel of pixels.

14. The filter system of claim 13, said average grayscale value further comprising:
(a) a sum of grayscale values from said all visual non-edge pixels in said kernel of pixels;
(b) said sum divided by a number of said all visual non-edge pixels in a kernel of pixels.

15. A filter system for post-processing a digital image, said digital image haviiig a plurality of visual-edge pixels and a plurality of visual non-edge pixels, said filter system comprising:
(a) an edge mapper for producing a binary map of said visual edge pixels and said visual non-edge pixels;
(b) a pixel sorter comprising;
(i) said pixel sorter for reading said binary map; and
(ii) said pixel sorter for assigning to each pixel a type of filtration to be provided by said filter system;
(c) an adaptive filter for receiving output from said pixel sorter; and
(d) said adaptive filter comprising:
(i) a de-ringing module for post-processing said visual non-edge pixels, said de-ringing module further comprising a weighting module, said weighting module altering a grayscale value of each visual non-edge pixel for final display in direct proportion to an average grayscale value of all visual non-edge pixels in a kernel of pixels, said average grayscale value further comprising:
(A) a sum of grayscale values from said all visual non-edge pixels in said kernel of pixels; and
(B) said sum divided by a number of said all visual non-edge pixels in a kernel of pixels;

(C) said weighting module for executing a weighting subroutine for altering a grayscale value of each visual non-edge pixel for final display in proportion to an average grayscale value of all visual non-edge pixels in said kernel of pixels, said weighting subroutine further comprising:
(1) a FinalGrayScale(i, j) variable;
(2) said FinalGrayScale(i, j) variable storing a grayscale value for final display of each pixel being processed;
(3) a Kernel variable for storing a count of pixels in said kernel of pixels;
(4) a SumEdgePixels variable for counting a number of said visual edge pixels in said kernel of pixels;
(5) a Non EdgeGrayscaleSum variable for storing said sum of grayscale values of all visual non-edge pixels in said kernel of pixels; and
(6) wherein said weighting subroutine is defined as:

FinalGrayScale(i, j)=(1/(Kernel−SumEdgePixels))* NonEdgeGrayscaleSum; and (ii) an edge sharpener for post-processing said edge pixels.

16. The filter system of claim 1, said edge sharpener further comprising an unsharp masking module, said unsharp masking module adding a high pass filtered image of said digital image to said digital image.

17. The filter system of claim 16, said unsharp masking module sharpening visual edges in said digital image by an edge sharpening factor A.

18. The filter system of claim 16, said high pass filtered image being obtained by subtracting a low pass filtered image of said digital image from a scaled version of said digital image.

19. A filter system for post-processing a digital image, said digital image having a plurality of visual-edge pixels and a plurality of visual non-edge pixels, said filter system comprising:
(a) an edge mapper for producing a binary map of said visual edge pixels and said visual non-edge pixels;
(b) a pixel sorter comprising;
(i) said pixel sorter for reading said binary map; and
(ii) said pixel sorter for assigning to each pixel a type of filtration to be provided by said filter system;
(c) an adaptive filter for receiving output from said pixel sorter; and
(d) said adaptive filter comprising:
(i) a de-ringing module for post-processing said visual non-edge pixels; and
(ii) an edge sharpener for post-processing said edge pixels said edge sharpener further comprising an unsharp masking module, said unsharp masking module adding a high pass filtered image of said digital image to said digital image, said high pass filtered image being obtained by subtracting a low pass filtered image of said digital image from a scaled version of said digital image, said low pass filtered image for each pixel being processed further comprising:
(A) an EdgeGrayscaleSum variable for storing a sum of grayscale values of all visual edge pixels in a kernel of pixels surrounding said pixel being processed;

(B) a SumEdgePixels variable for counting a number of pixels representing a visual edge in said kernel of pixels surrounding said pixel being processed; and (C) said low pass filtered image for said pixel being processed being the ratio EdgeGrayscaleSum/Sum EdgePixels.

20. A filter system for post-processing a digital image, said digital image having a plurality of visual-edge pixels and a plurality of visual non-edge pixels, said filter system comprising:

(a) an edge mapper for producing a binary map of said visual edge pixels and said visual non-edge pixels;
(b) a pixel sorter comprising;
　(i) said pixel sorter for reading said binary map; and
　(ii) said pixel sorter for assigning to each pixel a type of filtration to be provided by said filter system;
(c) an adaptive filter for receiving output from said pixel sorter; and
(d) said adaptive filter comprising:
　(i) a de-ringing module for post-processing said visual non-edge pixels; and
　(ii) an edge sharpener for post-processing said edge pixels, said edge sharpener further comprising an unsharp masking module, said unsharp masking module adding a high pass filtered image of said digital image to said digital image, said unsharp masking module for executing a sharpening subroutine, said sharpening subroutine further comprising:
　　(A) a FinalGrayScale(i, j) variable for storing a grayscale value for final display of each pixel being processed;
　　(B) a Grayscale(i, j) variable for storing a grayscale value of an individual pixel at coordinates i and j in said digital image;
　　(C) a SumEdgePixels variable for storing a count of visual edge pixels in said kernel of pixels;
　　(D) an EdgeGrayscaleSum variable for storing a sum of grayscale values of all visual edge pixels in said kernel of pixels; and
　　(E) a selectable λ variable for storing an edge sharpening factor; and
　　(F) wherein said sharpening subroutine is defined as:

FinalGrayScale(i, j)=(1+λ)*Grayscale(i, j)−(1/SumEdgePixels)*λ*EdgeGrayscaleSum.

21. The filter system of claim 1, said edge sharpener further comprising a limiter for decreasing said edge sharpening to avoid saturation of visual edges.

22. The filter system of claim 1, said filter system sharing data and calculations between said edge mapper, said pixel sorter, and said adaptive filter to reduce calculations.

23. A method of filtering signals of a digital image composed of a plurality of pixels, said method comprising the steps of:

(a) mapping visual edges in said digital image to produce an edge map;
(b) sorting pixels of said edge map into the following categories:
　(i) edge pixels representing visual edges;
　(ii) non-edge pixels representing visual non-edges substantially surrounded by visual non-edge pixels; and
　(iii) non-edge pixels representing visual non-edges substantially surrounded by visual edge pixels;
(c) edge sharpening said edge pixels;
(d) de-rining said non-edge pixels substantially surrounded by visual non-edge pixels;
(e) performing neither edge sharpening nor de-ringing on said non-edge pixels substantially surrounded by visual edge pixels; and
(f) displaying said edge pixels after edge sharpening and said non-edge pixels after de-ringing.

24. The method of claim 23, said step of mapping visual edges further comprising the step of mapping visual edges pixel by pixel using at least one edge gradient operator.

25. The method of claim 23, said step of sorting pixels of said edge map further comprising the step of sorting each non-edge pixel according to a number of edge pixels in a kernel of pixels surrounding said non-edge pixel.

26. The method of claim 23, said step of sorting pixels of said edge map further comprising the step of sorting pixels of said edge map into the category of non-edge pixels representing visual non-edges substantially surrounded by visual edge pixels if a number of edge pixels in a kernel of pixels surrounding said non-edge pixel is greater than a selected threshold.

27. The method of claim 23, said step of de-ringing said non-edge pixels further comprising the steps of:
(a) averaging grayscale values of pixels in said kernel of pixels surrounding each non-edge pixel; and
(b) altering a grayscale value of each non-edge pixel in proportion to averaged grayscale values of said pixels in a kernel of pixels surrounding each non-edge pixel.

28. The method of claim 23, said step of de-ringing non-edge pixels further comprising the step of de-ringing using at least some data previously calculated in said steps of mapping and sorting.

29. The method of claim 23, said step of edge sharpening further comprising the step of unsharp masking each edge pixel by adding a high pass filtered image of said edge pixel to an original image of said edge pixel.

30. The method of claim 23, said step of edge sharpening further comprising the step of edge sharpening using at least some data previously calculated in said steps of mapping, sorting, and de-ringing.

31. A method for post-processing a digital image having a plurality of pixels, said method comprising the steps of:

(a) edge mapping edge pixels representing visual edges and non-edge pixels representing visual non-edges in said digital image to produce a binary map of edge mapped individual pixels;
(b) sorting said edge mapped individual pixels for different types of filtration;
(c) filtering sorted individual pixels adaptively, said step of filtering comprising the steps of:
　(i) edge sharpening said edge pixels;
　(ii) de-ringing said non-edge pixels substantially surrounded by visual non-ed gep pixels; and
　(iii) performing neither edge sharpening nor de-ringing on said non-edge pixels substantially surrounded by visual edge pixels; and
(d) wherein said steps of edge sharpening and de-ringing may be performed substantially simultaneously.

32. The method of claim 31, said step of sorting further comprising the steps of:
(a) designating a group of pixels surrounding and including each non-edge pixel being sorted;
(b) reading a grayscale value of each pixel in said group of pixels;
(c) omitting said de-ringing and said edge sharpening for said non-edge pixel if said group of pixels includes at least a selected minimum number of edge pixels; and (d) de-ringing said non-edge pixel if said group of pixels does not include at least a selected minimum number of edge pixels.

33. The method of claim 32, said step of de-ringing further comprising the step of scaling for display said grayscale value of each non-edge pixel sorted for de-ringing in proportion to averaged grayscale values of non-edge pixels in said group of pixels.

34. The method of claim 31, said step of edge sharpening further comprising the step of unsharp masking an edge pixel by adding a high pass filtered image of said edge pixel to an original image of said edge pixel.

35. A filter system for post-processing a digital image, said digital image having a plurality of visual-edge pixels and a plurality of visual non-edge pixels, said filter comprising:
 (a) edge mapping means for producing a binary map of said visual edge pixels and said visual non-edge pixels;
 (b) pixel sorting means for assigning visual non-edge pixels substantially surrounded by visual non-edge pixels to a de-ringing means, edge pixels to an edge sharpening means, and non-edge pixels substantially surrounded by visual edge pixels to neither said de-ringing means nor said edge sharpening means;
 (c) said de-ringing means for post-processing said visual non-edge pixels; and
 (d) said edge sharpening means for post-processing said edge pixels.

36. The filter of claim 35, said edge mapping means further comprising edge detecting means.

37. A filter system for post-processing a digital image, said digital image having a plurality of pixels, said filter system comprising:
 (a) an edge mapper for producing a binary map of said plurality of pixels;
 (b) a pixel sorter for sorting pixels of said digital image into categories for appropriate post-processing;
 (c) a first post-processing module for post-processing a first category of said plurality of pixels, said first post-processing module is a de-ringing module and said first category is non-edge pixels substantially surrounded by visual non-edge pixels;
 (d) a second post-processing module for post-processing a second category of said plurality of pixels, said second post-processing module is an edge sharpening module and said second category is edge pixels; and
 (e) a third category of said plurality of pixels being non-edge pixels substantially surrounded by visual edge pixels that receive no post-processing.

38. The filter system of claim 37 wherein said pixel sorter sorts pixels into said third category if a number of edge pixels in a kernel of pixels surrounding one of said non-edge pixels is greater than a selected threshold.

39. The filter system of claim 1, wherein said de-ringing module and said edge sharpener operate substantially simultaneously.

40. The method of claim 23, wherein said step of edge sharpening is performed substantially simultaneously with said step of de-ringing.

41. The filter of claim 35, wherein said de-ringing means and said edge sharpening means operate substantially simultaneously.

42. The filter system of claim 37, wherein said first post-processing module and said second post-processing module operate substantially simultaneously.

* * * * *